(12) United States Patent  
Hsu et al.

(10) Patent No.: US 7,782,551 B2
(45) Date of Patent: Aug. 24, 2010

(54) WIDE-ANGLE IMAGE PICK-UP LENS SYSTEM AND VEHICLE WITH SAME

(75) Inventors: Te-Lun Hsu, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 187 days.

(21) Appl. No.: 12/118,922

(22) Filed: May 12, 2008

(65) Prior Publication Data

US 2009/0034101 A1  Feb. 5, 2009

(30) Foreign Application Priority Data

Aug. 2, 2007 (CN) .................... 2007 1 0201261

(51) Int. Cl.
*G02B 13/04* (2006.01)
*G02B 9/60* (2006.01)

(52) U.S. Cl. .................... 359/753; 359/749; 359/770

(58) Field of Classification Search ......... 359/749–753, 359/763, 770, 680–682
See application file for complete search history.

(56) References Cited

U.S. PATENT DOCUMENTS

| | | | | |
|---|---|---|---|---|
| 5,861,999 A | * | 1/1999 | Tada | 359/752 |
| 7,095,569 B2 | | 8/2006 | Rege et al. | |
| 7,405,890 B2 | * | 7/2008 | Nakamura | 359/781 |
| 7,633,688 B2 | * | 12/2009 | Kamo | 359/717 |
| 2006/0069478 A1 | * | 3/2006 | Iwama | 701/36 |
| 2008/0239517 A1 | * | 10/2008 | Mori | 359/781 |

\* cited by examiner

*Primary Examiner*—Jordan M. Schwartz
(74) *Attorney, Agent, or Firm*—Andrew C. Cheng (57) ABSTRACT

A wide-angle image pick-up lens system includes a first lens group with negative refracting power and a second lens group with positive refracting power. The first lens group and the second lens group are aligned in order from an object side to an image side. The first lens group and the second lens group satisfy the following conditions: $-0.15 < f_{10}/f_{12} < -0.05$, $0.3 < f_{10}/f_{14} < 0.8$, wherein $f_{10}$ is a focal length system, $f_{12}$ is an effective focal length of the first lens group, and $f_{14}$ is an effective focal length of the second lens group. The first lens group includes a third lens with positive refracting power. A refractive index of the third lens is above of 1.85.

13 Claims, 9 Drawing Sheets

WIDE-ANGLE IMAGE PICK-UP LENS SYSTEM AND VEHICLE WITH SAME

BACKGROUND

1. Technical Field

The present invention relates to image pick-up lens systems, and particularly to a wide-angle image pick-up lens system and a vehicle using the same.

2. Description of Related Art

It is known that vehicles such as cars and trucks have blind spots when an operator uses mirrors. Therefore, a camera-based rear view vision system has been proposed to eliminate the blind spots.

Typically, the camera-based rear view vision system includes a camera located on the rear of the vehicle. However, viewing angles of the typical camera used in the vision systems are narrow and may still leave blind spots.

Therefore, what is desired is to provide a camera with a wide-angle image pick-up lens system and a vehicle with the same for providing viewing angles that eliminate blind spots around the vehicle.

SUMMARY

The present invention relates to a wide-angle image pick-up lens system. According to an exemplary embodiment, the wide-angle image pick-up lens system includes a first lens group with negative refracting power, and a second lens group with positive refracting power. The first lens group and the second lens group are aligned in that order from an object side to an image side. The first lens group and the second lens group satisfy the following conditions: $-0.15 < f_{10}/f_{12} < -0.05$, $0.3 < f_{10}/f_{14} < 0.8$, wherein $f_{10}$ is a focal length system, $f_{12}$ is an effective focal length of the first lens group, and $f_{14}$ is an effective focal length of the second lens group. The first lens group includes a third lens with positive refracting power. A refractive index of the third lens is above of 1.85.

Other advantages and novel features of the present invention will become more apparent from the following detailed description of preferred embodiment when taken in conjunction with the accompanying drawings.

BRIEF DESCRIPTION OF THE DRAWINGS

Many aspects of the present wide-angle image pick-up lens system and a vehicle with same can be better understood with reference to the following drawings. The components in the drawings are not necessarily drawn to scale, the emphasis instead being placed upon clearly illustrating the principles of the present wide-angle image pick-up lens system and vehicle. Moreover, in the drawings, like reference numerals designate corresponding parts throughout the several views.

DETAILED DESCRIPTION OF THE EMBODIMENTS

Reference will now be made to the drawings to describe the various present embodiments in detail.

Figure 1:
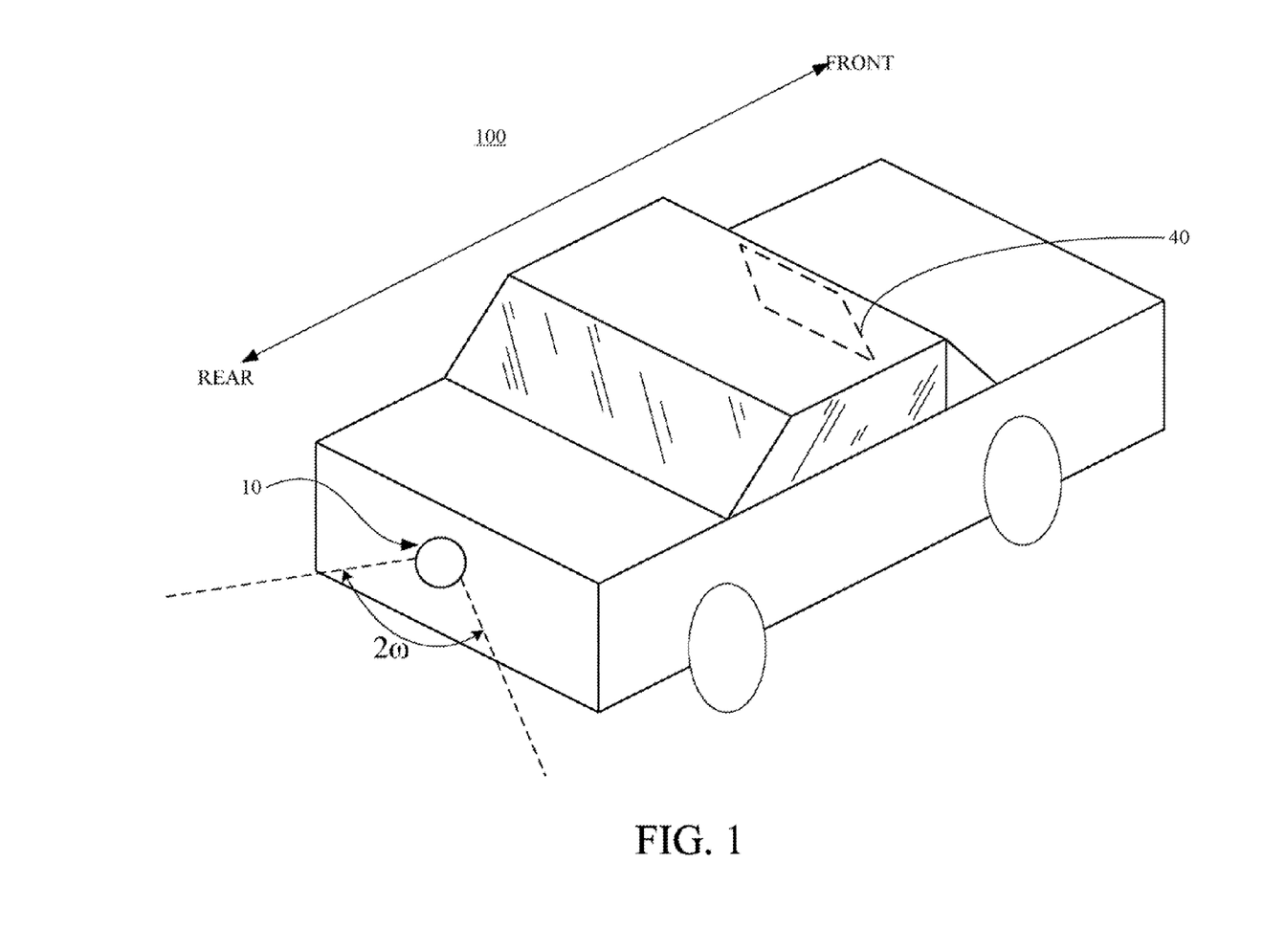
FIG. 1 a schematic view showing a vehicle with a wide-angle image pick-up lens system according to an exemplary embodiment.
Figure 2:
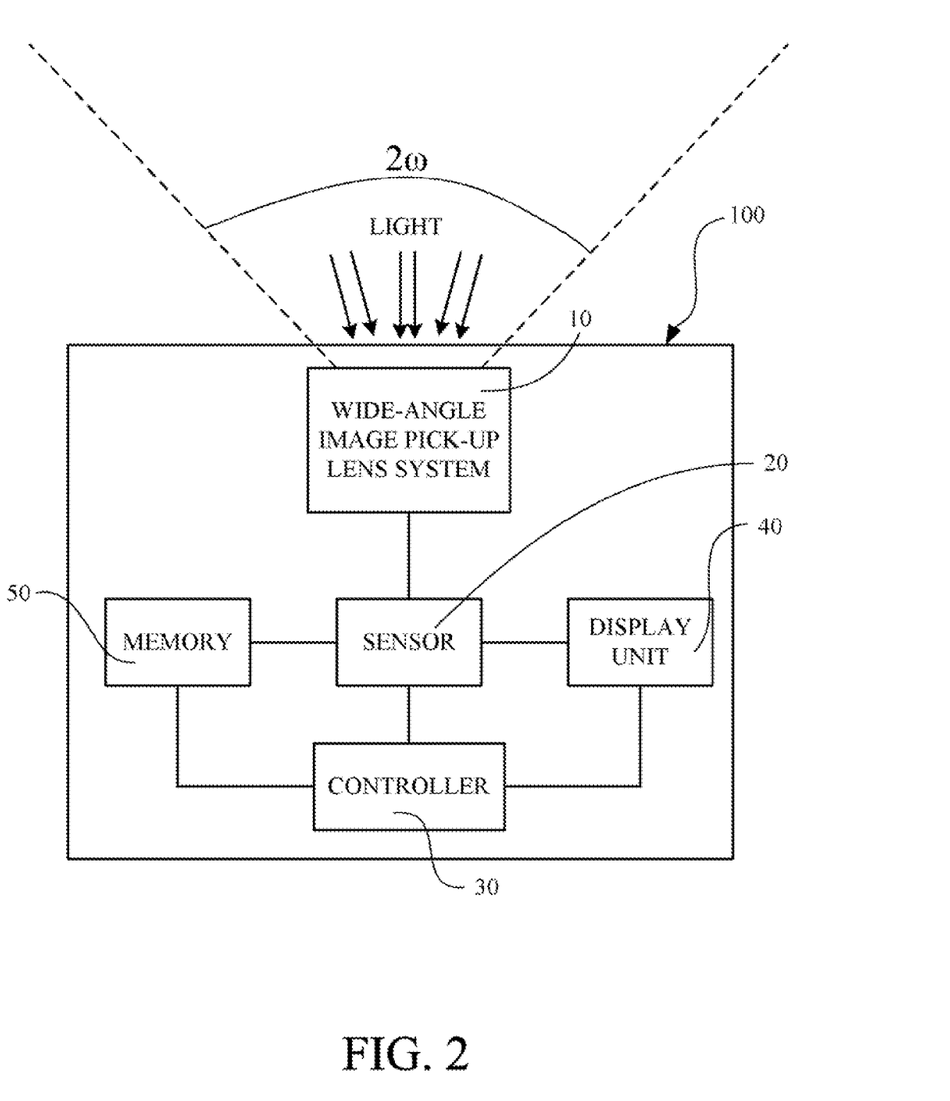
FIG. 2 is a block diagram showing a working principle of the vehicle with the wide-angle image pick-up lens system of FIG. 1.

Referring to FIG. 1 and FIG. 2, a wide-angle image pick-up lens system 10 according to a first embodiment of the present invention is shown. The lens system 10 is used for a vehicle 100 to provide an operator with a wide viewing rearward the vehicle. The vehicle 100 may be an automobile of any kind. The lens system 10 includes an image sensor 20 such as a CCD (Charge-Coupled Device) image sensor or a CMOS (Complimentary Metal-Oxide Semiconductor) image sensor, a controller 30, a display unit 40 such as a CRT (Cathode Ray Tube) or a LCD (Liquid Crystal Display) and a memory 50 such as a HDD (Hard Disk Drive) or a flash memory.

The lens system 10 is used for receiving light beams emitted by or reflected by outside objects present within a viewing angle of about 135°. The light beams received by the lens system 10 are directed to the image sensor 20. The image sensor 20 converts the light beams received from the lens system 10 to electrical signals, which are digitized to form digital images. The digital images are displayed on the display unit 40. The digital images may also be encoded to image files and stored in the memory 50. The controller 30 is a processing unit for controlling various operations of the vehicle 100.

Figure 3:
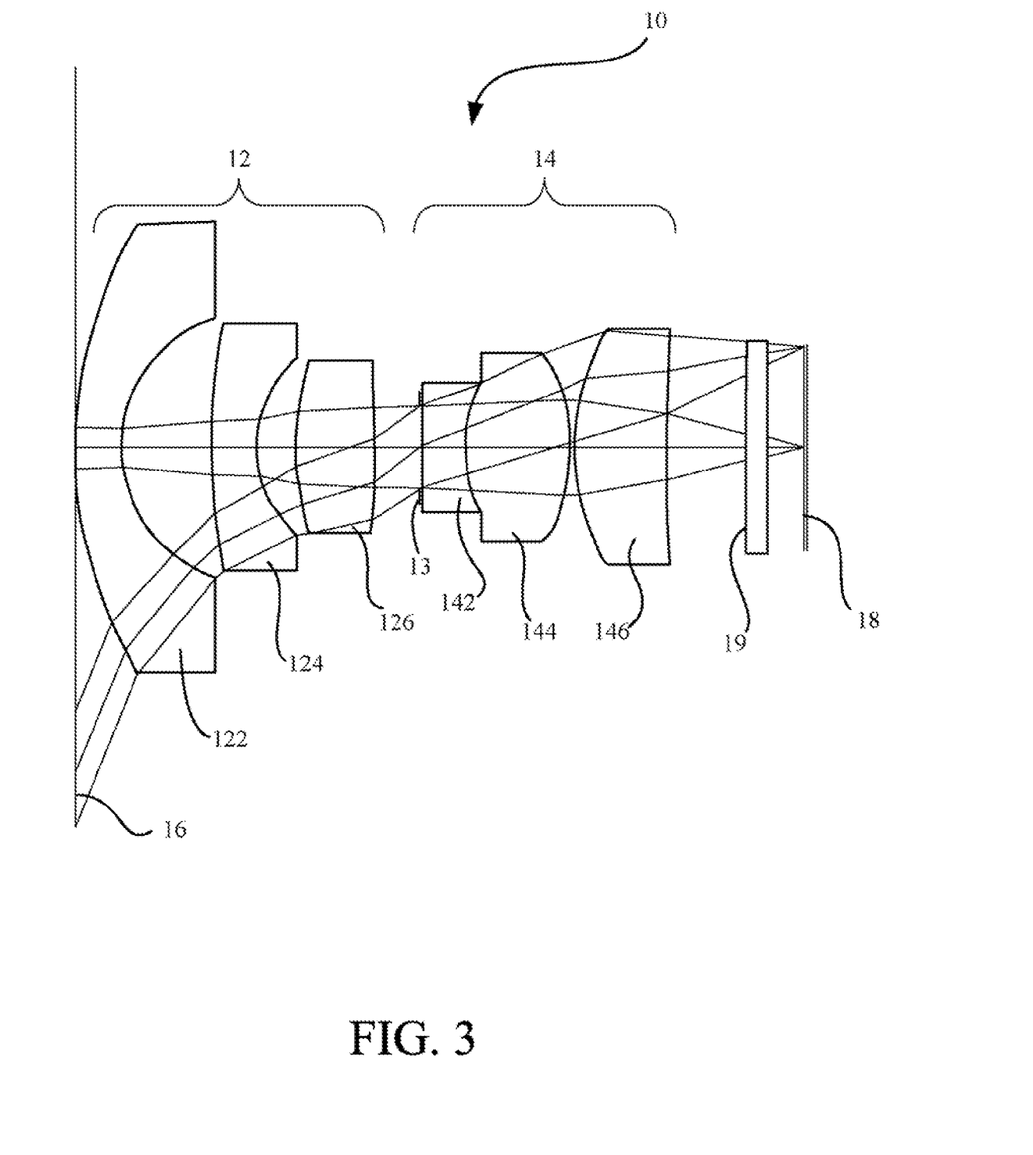
FIG. 3 is a schematic cross-sectional view of the wide-angle image pick-up lens system of FIG. 2, and also showing an image pick-up surface and essential optical paths.

Referring to FIG. 3, the lens system 10 includes a first lens group 12 and a second lens group 14. The first lens group 12 and the second lens group 14 are aligned in that order from an object side 16 to an image side 18. The first lens group 12 has negative refracting power for effective wide-angle reception of incident light beams, and partially correcting spherical aberrations. The second lens group 14 has positive refracting power for receiving light beams transmitted from the first lens group 12 and converging the light beams to the image side 18.

The first lens group 12 includes a first lens 122, a second lens 124, and a third lens 126 that are aligned in that order from the object side 16 to the second lens group 14. The first lens 122 and the second lens 124 are both meniscus-shaped lenses having concave surfaces in face of the object side 16. Both the first and second lenses 122, 124 have negative refractive power. The third lens 126 is biconvex lens having positive refractive power. The third lens 126 receives light beams transmitted from the first lens 122 and the second lens 124 and corrects spherical aberrations of the light beams transmitted therethrough.

The second lens group 14 includes a fourth lens 142, a fifth lens 144 and sixth lens 146 that are aligned in that order from the first lens group 12 to the image side 18. The fourth lens 142 is biconcave lens having negative refracting power. A curvature of one of the concave surfaces, which faces the image side 18, of the fourth lens 142 is much larger than that of an opposite concave surface, which faces the first lens group 12 thereof. The distinction of the curvatures of the concave surfaces of the fourth lens 142 is more apparently seen from table 1 and table 2. The fifth lens 144 is biconvex lens having positive refracting power. The fourth lens 142 and the fifth lens 144 are conglutinated to each other to form a cemented lens. The cemented lens corrects a chromatic aberration of light beams transmitted through the lens system 10. The sixth lens 146 is a convex lens having convex surface in face of the object side 16. The sixth lens 146 has positive refracting power for correcting a distortion aberration of light beams transmitted through the lens system 10.

The first lens 122, the second lens 124, the third lens 126, the fourth lens 142, the fifth lens 144 and the sixth lens 146 are all made from glass material, for the glass material lens is resistant to high temperature, erosion, scratches and so on. Opposite convex and/or concave surfaces of the first lens 122, the second lens 124, the third lens 126, the fourth lens 142, the fifth lens 144 and the sixth lens 146 are spherical, for manufacturing spherical surfaces is more cost effective than manufacturing aspherical surfaces.

The lens system 10 may further include an aperture stop 13 and a filter 19. The aperture stop 13 is positioned between the first lens group 12 and the second lens group 14 for restricting the amount of light beams transmitted from the first lens group 12 to the second lens group 14. It should be noted that the aperture stop 13 may be positioned between lens elements in the first lens group 12 or between lens elements in the second lens group 14 according to specific applications. The filter 19 is positioned between the second lens group 14 and the image side 18. The filter 19 is an infrared ray cut filter, which is used for filtrating the infrared light of the light beams transmitted through the lens system 10. Understandably, the filter 19 may be positioned between any two elements of the lens system 10.

In order to control the wide viewing angle of the lens system 10 to be greater than 135°, the lens system 10 preferably satisfies the following conditions: $-0.15 < f_{10}/f_{12} < -0.05$ (1), $0.3 < f_{10}/f_{14} < 0.8$ (2), $n_3 > 1.85$ (3), wherein $f_{10}$ is a focal length system of the lens system 10, $f_{12}$ is an effective focal length of the first lens group 12, $f_{14}$ is an effective focal length of the second lens group 14, and $n_3$ is a refractive index of the third lens 126 of the first lens group 12. In this embodiment, the refractive index $n_3$ of the third lens 126 above the lower limit 1.85 is corresponding to an incident light beam having a wavelength $\lambda$ of about 540 nm (nanometers).

The condition (1) is used for ensuring the first lens group 12 to have negative refracting power and for effective wide-angle reception of incident light beams. More specifically, if the ratio $f_{10}/f_{12}$ is above the upper limit $-0.05$, a length from the last lens (that is the sixth lens 146) of the lens system 10 to the focus of the lens system 10 will be shortened, which is not convenient for assembly of the lens system 10; and if the ratio $f_{10}/f_{12}$ is below the lower limit $-0.15$, a length TTL from the peak of the convex surface of the first lens 122 at the object side 16 to an image pick-up surface of the image side 18 will be lengthened, which brings in high-order aberration and affects imaging quality of the lens system 10. The condition (2) is for ensuring the second lens group 14 to have positive refracting power and for balancing the aberration generated by the first lens group 12 after the light beams are transmitted therethrough. More specifically, if the ratio $f_{10}/f_{14}$ is above the upper limit 0.8, aberration becomes too great to correct, and if the ratio $f_{10}/f_{14}$ is below the lower limit 0.3, distortion becomes too great to correct. The condition (3) requires the refractive index $n_3$ of the third lens 126 of the first lens group 12 to be above the lower limit 1.85, thus to ensure that the incident light beams can be effectively converged and then transmitted to the second lens group 14 to form image at the image side 18.

Furthermore, in order to control the length TTL of the lens system 10, the lens system 10 preferably further satisfies the following condition: $2 < \Sigma df_{12}/f_{10} < 5$ (4), wherein $\Sigma df_{12}$ is an overall length of the first lens group 12. If the ratio $\Sigma df_{12}/f_{10}$ is above the upper limit 5, it is difficult to effectively shorten the length TTL of the lens system 10. If the ratio $\Sigma df_{12}/f_{10}$ is below the lower limit 2, it narrows the wide viewing angle of the lens system 10.

The above explanations outline fundamental constituent features of the exemplary embodiments. Examples of the lens system 10 will be described below with reference to FIGS. 4A-5C. It is to be understood that the invention is not limited to these examples. The following are symbols used in the exemplary embodiment.

r: radius of curvature
t: distance between adjacent two surfaces along optical axis of the lens system 10
n: refractive index of lens
v: Abbe constant
d: diameter of the lens Table 1 shows lens data of the lens system 10 of the first exemplary embodiment.

TABLE 1

$f_{10}/f_{12} = -0.09$, $f_{10}/f_{14} = 0.55$, $\Sigma df_{12}/f_{10} = 4$, TTL = 18.57 mm

| Surface | r(mm) | t(mm) | n | v | d(mm) |
|---|---|---|---|---|---|
| 1st | 10.66113 | 1.2 | 1.743997 | 44.786431 | 11.38565 |
| 2nd | 3.5 | 2.323098 | | | 6.603872 |
| 3rd | 19.41876 | 1.1 | 1.620411 | 60.289582 | 6.25682 |
| 4th | 2.929662 | 0.9834977 | | | 4.464256 |
| 5th | 6.812808 | 2.009425 | 1.922860 | 18.896912 | 4.37416 |
| 6th | −16.86402 | 1.077454 | | | 3.66911 |
| aperture stop | infinite | 0.1 | | | 2.095947 |
| 7th | −74.52306 | 1.1 | 1.922860 | 18.896912 | 2.234779 |
| 8th | 3.488975 | 2.676568 | 1.743997 | 44.786431 | 3.27325 |
| 9th | 3.488975 | 2.676568 | 1.743997 | 44.786431 | 3.27325 |
| 10th | −4.442518 | 0.1 | | | 4.76468 |
| 11th | 5.753732 | 2.344477 | 1.743997 | 44.786431 | 5.981206 |
| 12th | 36.35022 | 2 | | | 5.714192 |
| filter | infinite | 0.55 | 1.516330 | 64.142022 | 5.392405 |
| | infinite | 0.9264418 | | | 5.330972 |

Figure 4A:
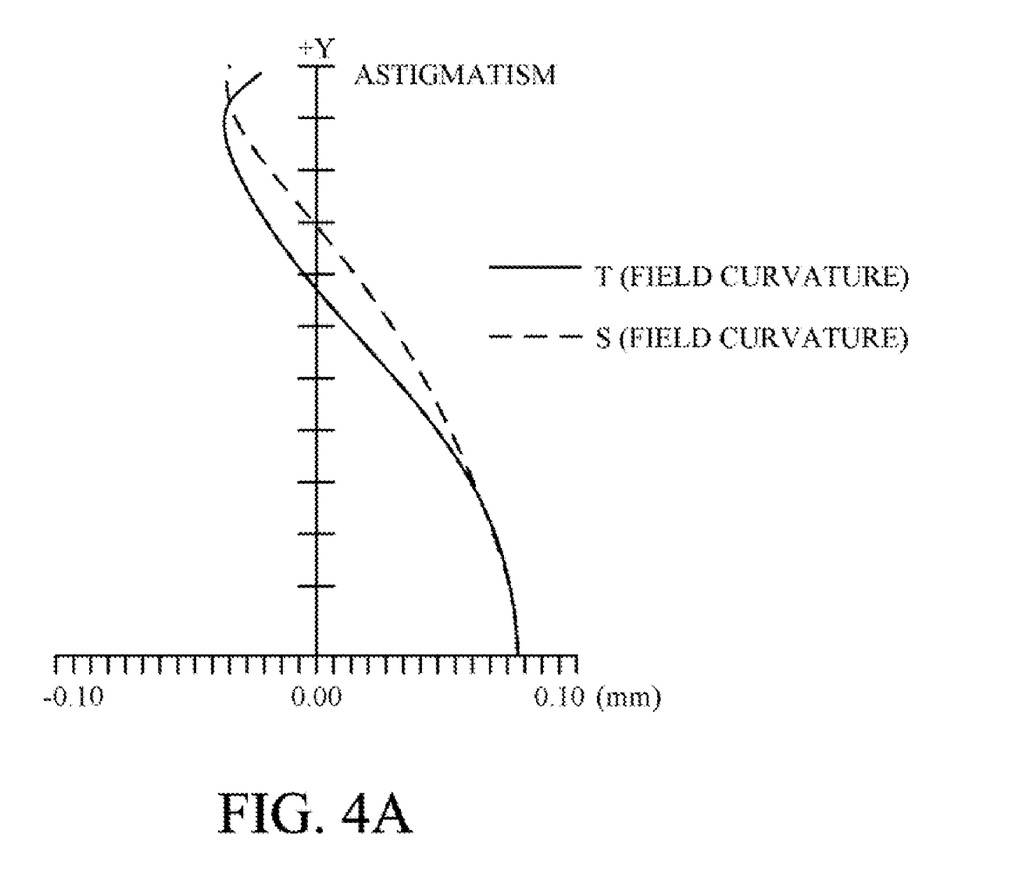
FIGS. 4A-4C are graphs respectively illustrating astigmatism, distortion and longitudinal spherical aberration of a first exemplary embodiment.
Figure 4B:
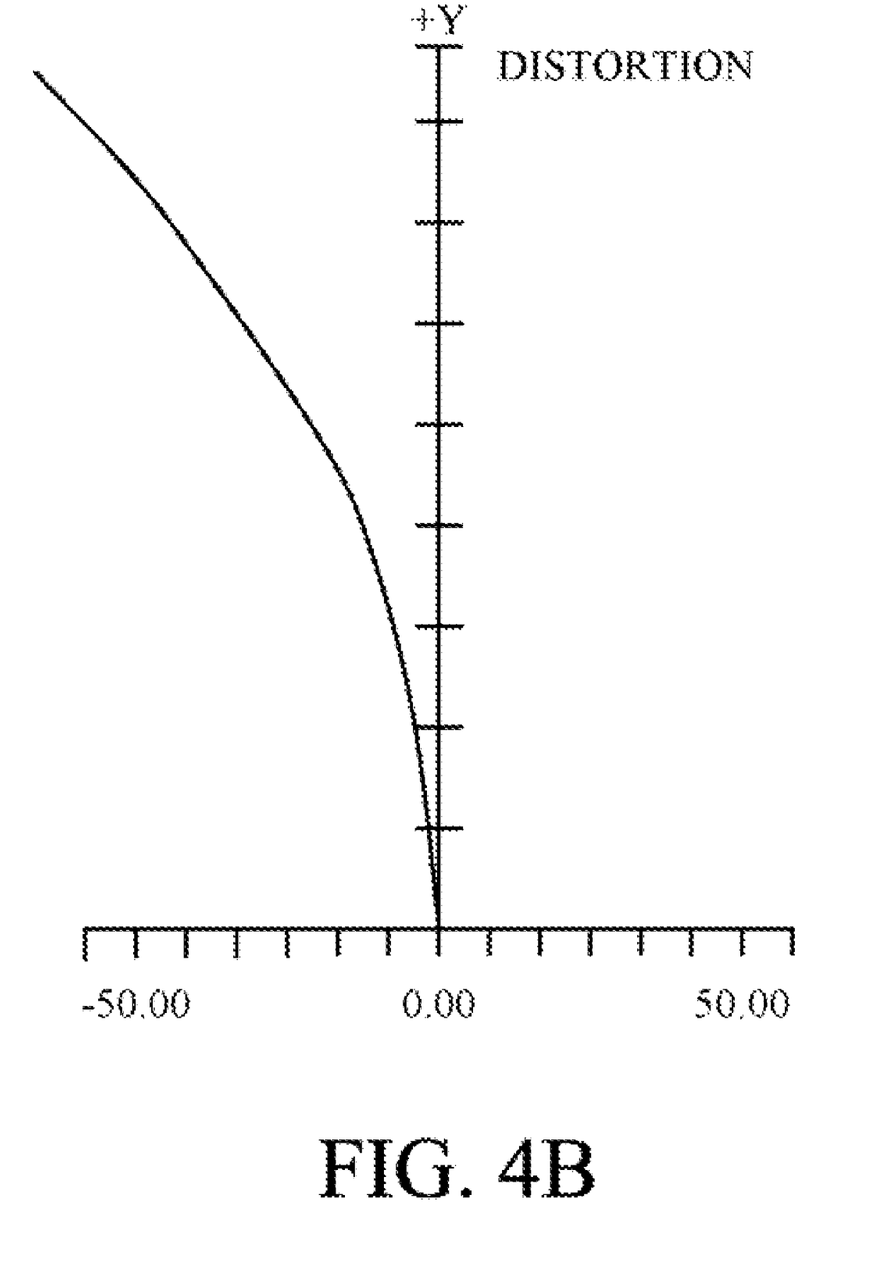
Figure 4C:
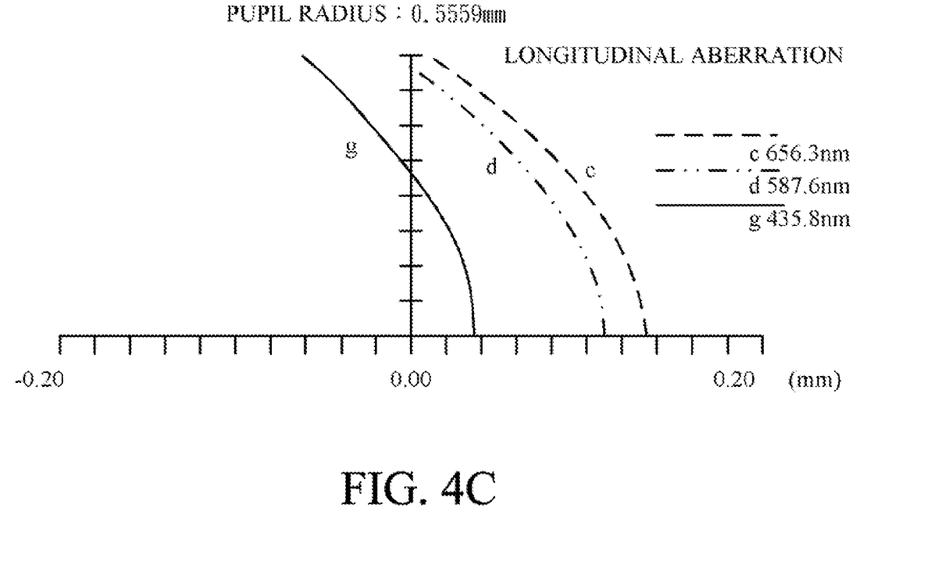

Referring to FIGS. 4A-4C, astigmatism (field curvature), distortion, and longitudinal spherical aberrations are respectively illustrated for the first embodiment of the lens system 10 having lens data listed in table 1, where half field angle ($\omega$) of the first embodiment can be as much as 67.509°.

Example 2

Table 2 shows lens data of the lens system 10 of a second exemplary embodiment.

TABLE 2

$f_{10}/f_{12} = -0.09$, $f_{10}/f_{14} = 0.55$, $\Sigma df_{12}/f_{10} = 4$, TTL = 22.05 mm

| Surface | r(mm) | t(mm) | n | v | d(mm) |
|---|---|---|---|---|---|
| 1st | 12.71371 | 1.431036 | 1.743997 | 44.786431 | 13.57773 |
| 2nd | 4.173854 | 2.770363 | | | 7.875314 |
| 3rd | 23.15745 | 1.311783 | 1.620411 | 60.289582 | 7.461444 |
| 4th | 3.493709 | 1.17285 | | | 5.323758 |
| 5th | 8.124477 | 2.396299 | 1.922860 | 18.896912 | 5.216316 |
| 6th | −20.11084 | 1.284896 | | | 4.375523 |
| aperture stop | infinite | 0.119253 | | | 2.499479 |
| 7th | 88.87097 | 1.311783 | 1.922860 | 18.896912 | 2.234779 |
| 8th | 4.160706 | 3.191887 | 1.743997 | 44.786431 | 3.903449 |
| 9th | 4.160706 | 3.191887 | 1.743997 | 44.786431 | 3.903449 |
| 10th | −5.297835 | 0.119253 | | | 5.682023 |
| 11th | 6.861497 | 2.795859 | 1.743997 | 44.786431 | 7.132766 |
| 12th | 43.34872 | 2.38506 | | | 6.814343 |
| filter | infinite | 0.655891 | 1.516330 | 64.142022 | 6.430603 |
| | infinite | 1.104809 | | | 6.357342 |

Figure 5A:
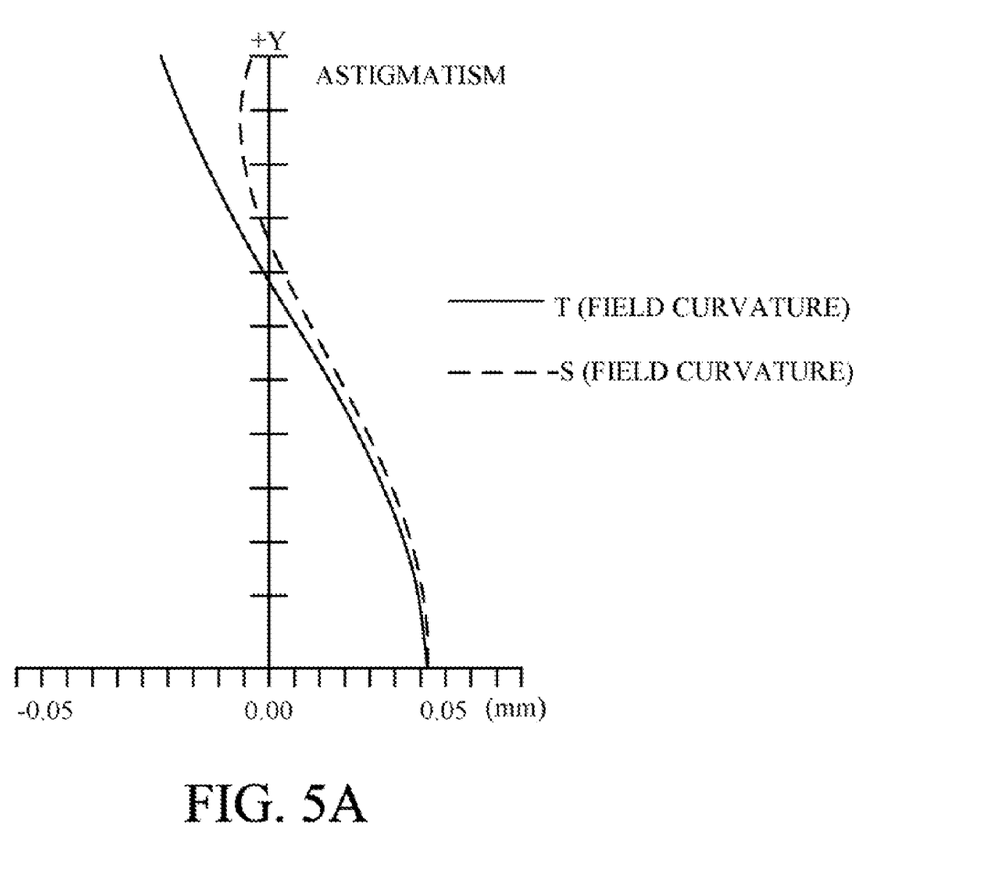
FIGS. 5A-5C are graphs respectively illustrating astigmatism, distortion and longitudinal spherical aberration of a second exemplary embodiment.
Figure 5B:
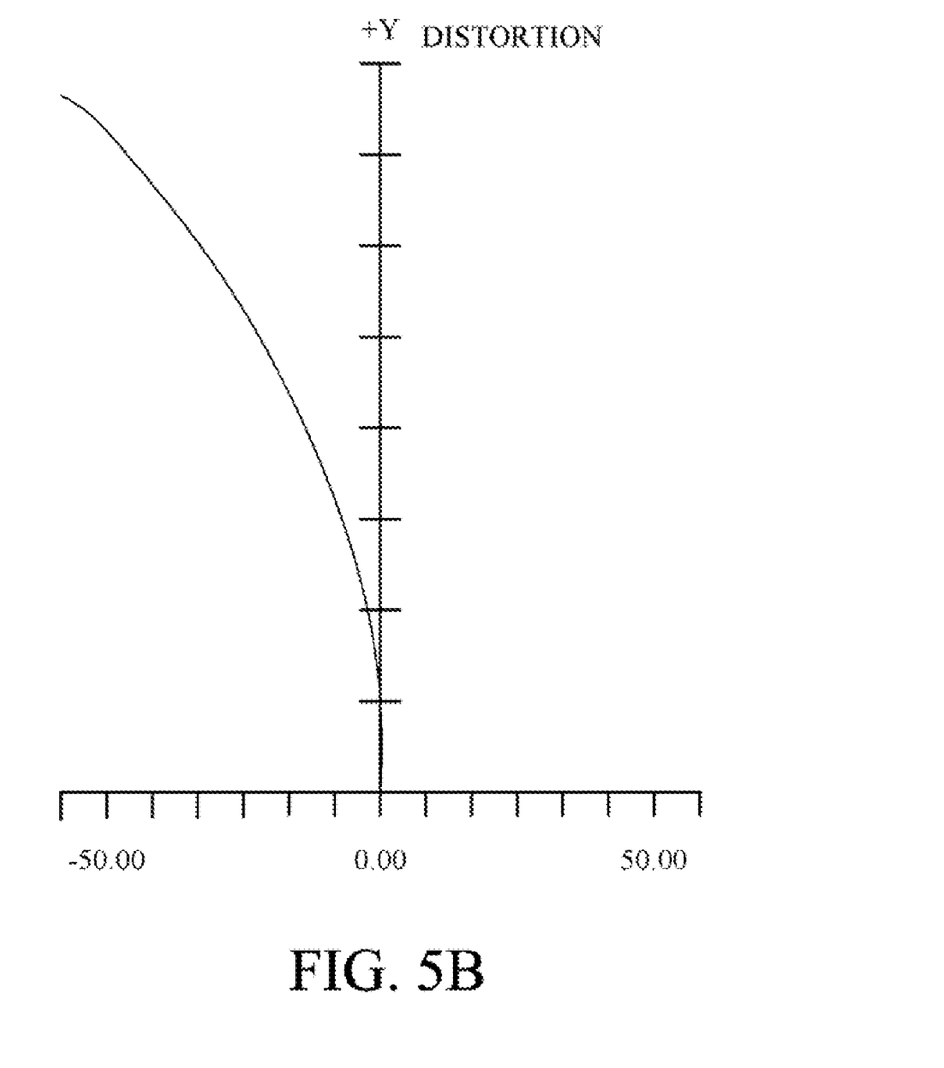
Figure 5C:
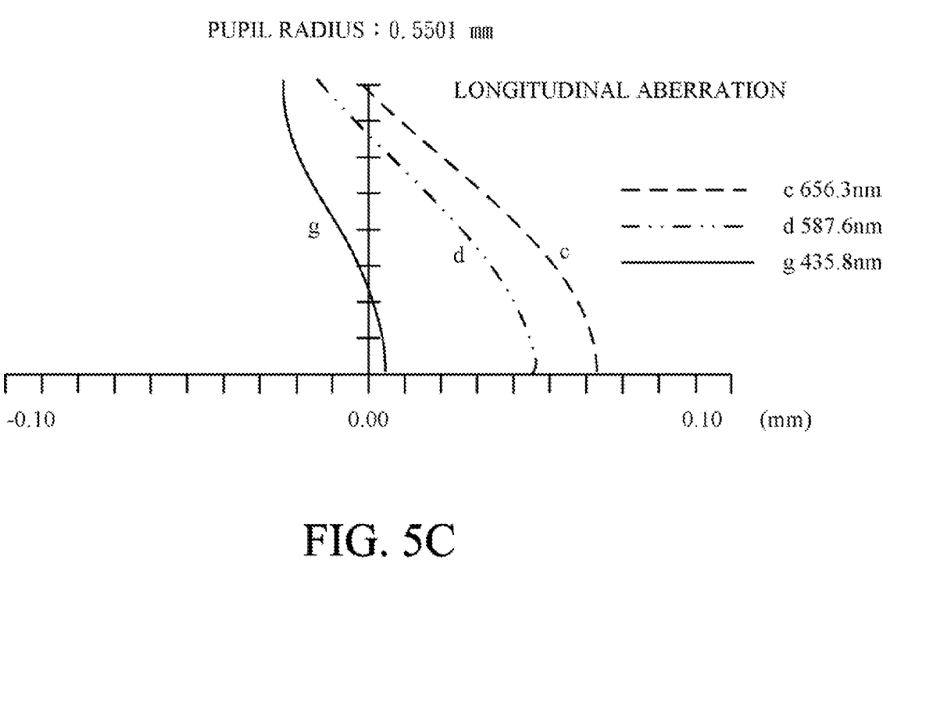

Referring to FIGS. 5A-5C, astigmatism (field curvature), distortion, and longitudinal spherical aberrations are respectively illustrated for the second embodiment of the lens system 10 having lens data listed in table 2, where half field angle ($\omega$) of the first embodiment can be as much as 68.327°.

It is to be understood, however, that even though numerous characteristics and advantages of the present invention have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A wide-angle image pick-up lens system, comprising:
   a first lens group with negative refracting power and comprising a first lens, a second lens, and a third lens being aligned in order from an object side to an image side; the third lens being a bi-convex lens with positive refracting power and having a refractive index above 1.85, the first lens and the second lens being both meniscus-shaped lenses and having their convex surfaces facing the object side, the first lens and the second lens each having negative refracting power; and
   a second lens group with positive refracting power, the first lens group and the second lens group being aligned in order from an object side to an image side, the first lens group and the second lens group satisfying the following conditions: $-0.15 < f10/f12 < -0.05$, $0.3 < f10/f14 < 0.8$, wherein f10 is a focal length of the system, f12 is an effective focal length of the first lens group, and f14 is an effective focal length of the second lens group.

2. The wide-angle image pick-up lens system as described in claim 1, further satisfying the following condition: $2 < \Sigma df_{12}/f_{10} < 5$, wherein $\Sigma df_{12}$ is an overall length of the first lens group.

3. The wide-angle image pick-up lens system as described in claim 1, wherein the second lens group comprises a fourth lens with negative refracting power, and a fifth lens and a sixth lens both with positive refracting power, the fourth lens being a bi-concave lens, the fifth lens being a bi-convex lens, the sixth lens being a meniscus-shaped lens and having its convex surface facing the image side, the fourth lens, the fifth lens and the sixth lens being aligned in order from the first lens group to the image side.

4. The wide-angle image pick-up lens system as described in claim 3, wherein the fourth lens and the fifth lens are cemented to each other to form a cemented lens.

5. The wide-angle image pick-up lens system as described in claim 1, further satisfying the following condition: $2\omega > 135°$, wherein $\omega$ is a half field angle of the wide-angle image pick-up lens system.

6. The wide-angle image pick-up lens system as described in claim 1, further comprising a filter positioned between the second lens group and the image side.

7. The wide-angle image pick-up lens system as described in claim 1, further comprising an aperture stop positioned between the first lens group and the second lens group.

8. A vehicle with a wide-angle image pick-up lens system, comprising:
   a wide-angle image pick-up lens system for receiving light beams originated from objects around the vehicle, the wide-angle image pick-up lens system comprising:
      a first lens group with negative refracting power and comprising a first lens, a second lens, and a third lens being aligned in order from an object side to an image side; the third lens being a bi-convex lens with positive refracting power and having a refractive index above 1.85, the first lens and the second lens being both meniscus-shaped lenses and having their convex surfaces facing the object side, the first lens and the second lens each having negative refracting power; and
      a second lens group with positive refracting power, the first lens group and the second lens group being aligned in order from an object side to an image side, the first lens group and the second lens group satisfying the following conditions: $-0.15 < f10/f12 < -0.05$, $0.3 < f10/f14 < 0.8$, wherein f10 is a focal length of the system, f12 is an effective focal length of the first lens group, and f14 is an effective focal length of the second lens group;
   an image sensor for receiving light beams transmitted from the wide-angle image pick-up lens system and generating digital images; and
   a display unit for displaying the digital images.

9. The vehicle as described in claim 8, wherein the wide-angle image pick-up lens system is mounted on a rear portion of the vehicle.

10. The vehicle as described in claim 8, further comprising a memory electrically connected between the image sensor and a controller, the digital images being encoded to image files and further stored in the memory by the controller.

11. The vehicle as described in claim 8, wherein the wide-angle image pick-up lens system further satisfies the following condition: $2 < \Sigma df12/f10 < 5$, wherein $\Sigma df12$ is an overall length of the first lens group.

12. The vehicle as described in claim 8, wherein the second lens group comprises a fourth lens with negative refracting power, and a fifth lens and a sixth lens both with positive refracting power, the fourth lens being a bi-concave lens, the fifth lens being a bi-convex lens, the sixth lens being a meniscus-shaped lens and having its convex surface facing the image side, the fourth lens, the fifth lens and the sixth lens being aligned in order from the first lens group to the image side.

13. The vehicle as described in claim 8, wherein the wide-angle image pick-up lens system further satisfies the following condition: $2\omega > 135°$, wherein $\omega$ is a half field angle of the wide-angle image pick-up lens system.

* * * * *